INVENTOR.
CHARLES A. SPAULDING, JR.
BY
his ATTORNEYS

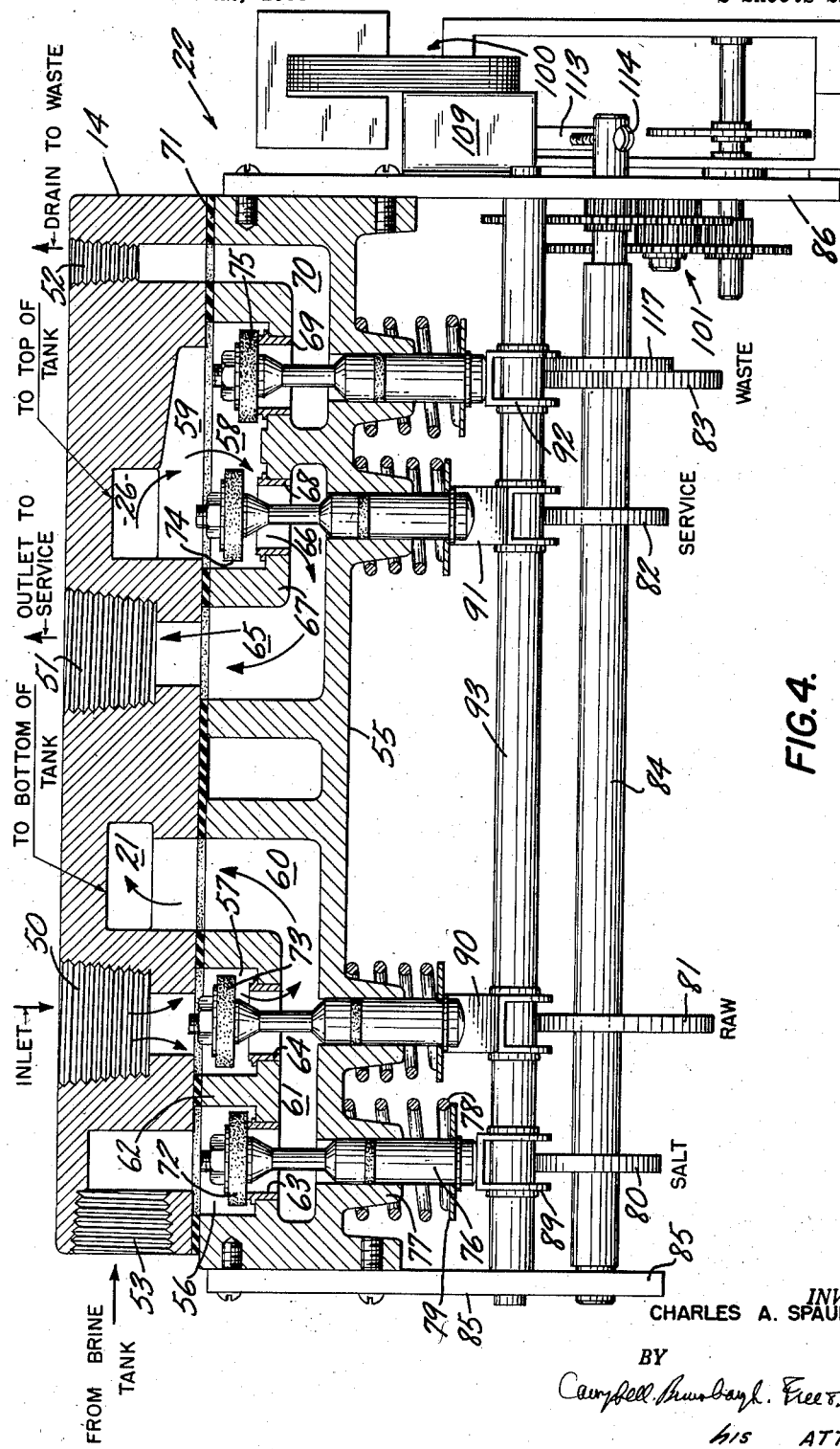

July 23, 1957     C. A. SPAULDING, JR     2,800,229
AUTOMATIC WATER SOFTENER
Filed Dec. 22, 1953     6 Sheets-Sheet 5
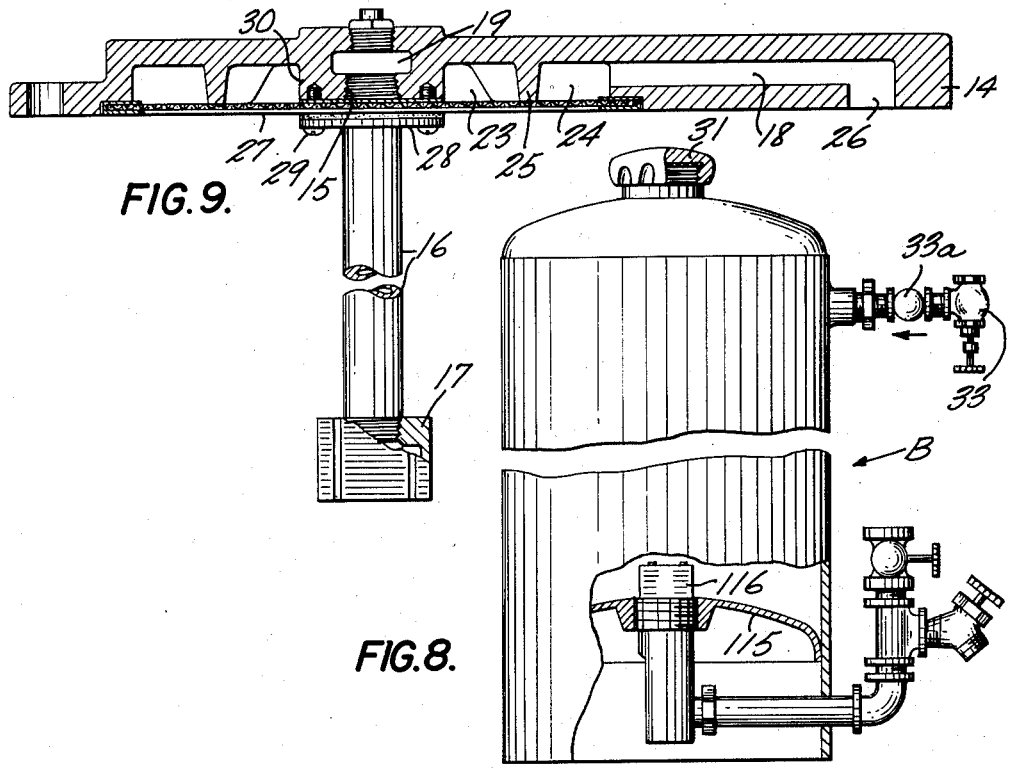
FIG. 9.
FIG. 8.
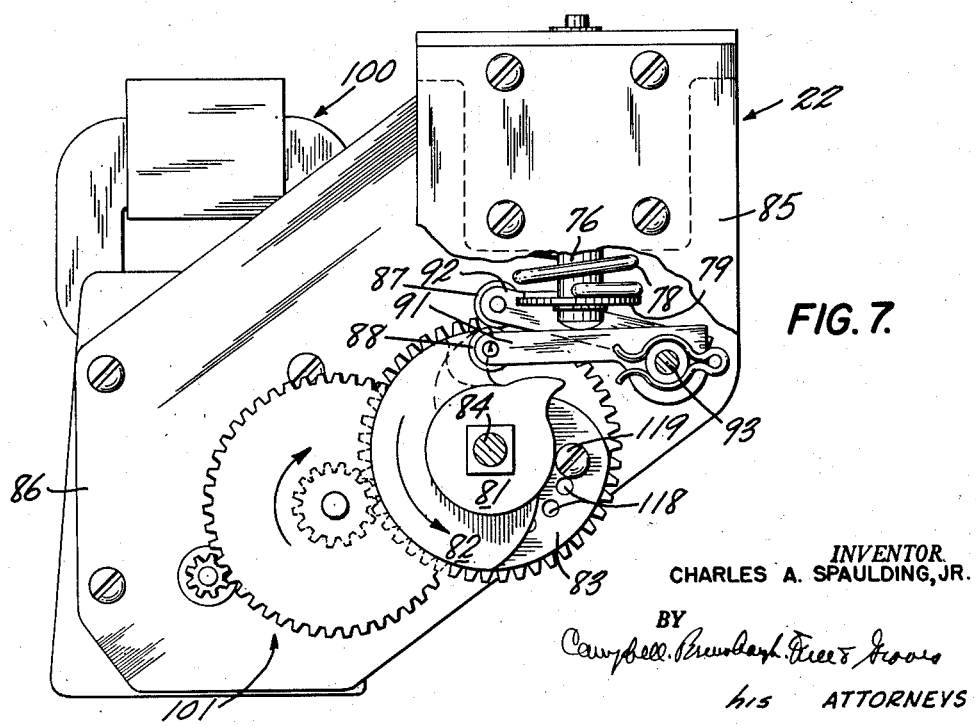
FIG. 7.
INVENTOR.
CHARLES A. SPAULDING, JR.
BY
*his* ATTORNEYS

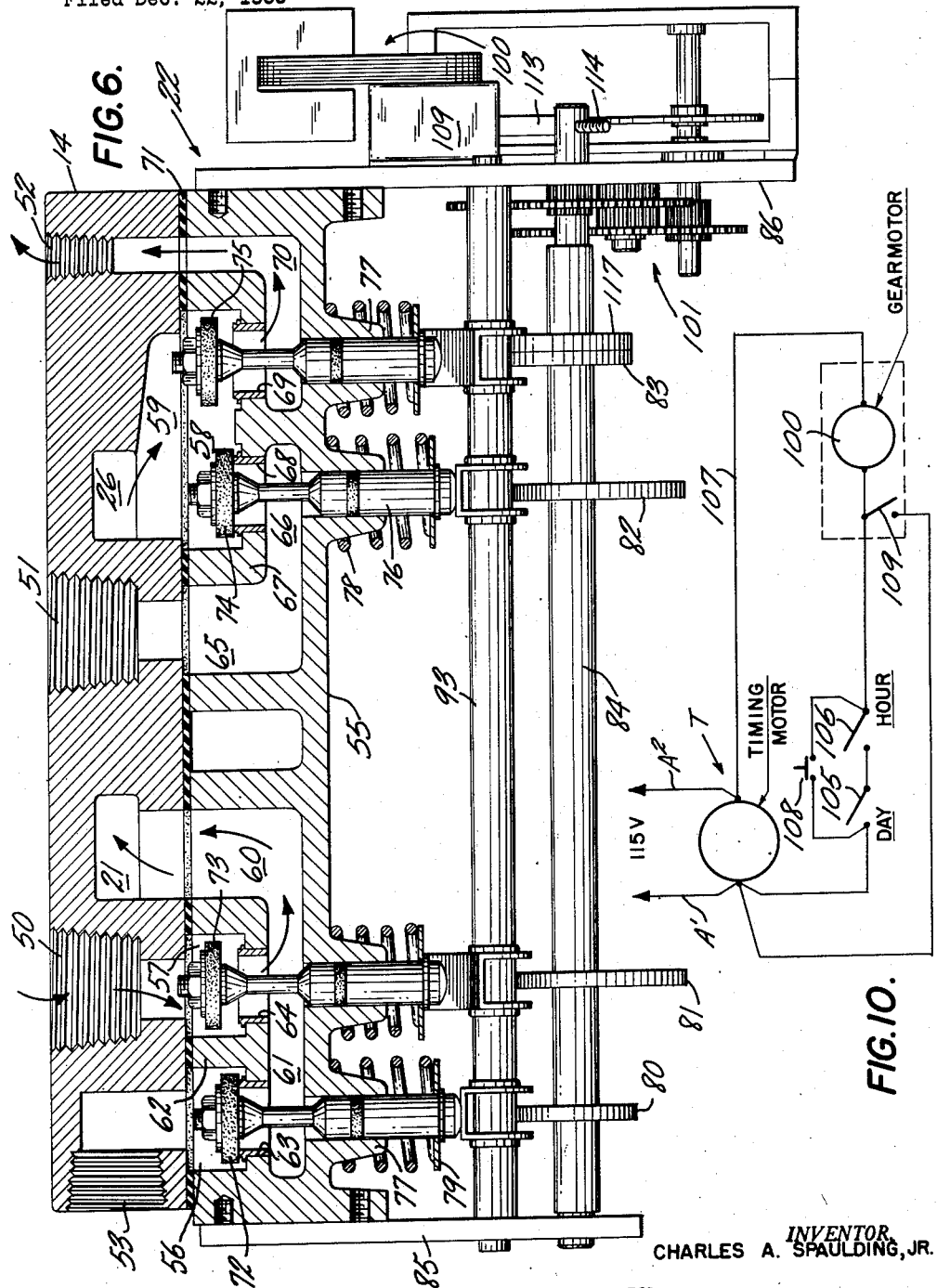

United States Patent Office 2,800,229
Patented July 23, 1957

2,800,229

AUTOMATIC WATER SOFTENER

Charles A. Spaulding, Jr., Omaha, Nebr.

Application December 22, 1953, Serial No. 399,779

4 Claims. (Cl. 210—142)

This invention relates to the improvements in water softening systems and it relates particularly to an improved type of household water softener which is substantially fully automatic in operation.

Ordinary household water softeners include a tank for receiving a water softening agent, referred to hereinafter as a zeolite, for removing the calcium, magnesium and, in some instances, iron hardness from the water by an ion exchange action. The water softening systems also include means for introducing salt or brine into the softener tank to regenerate the zeolite for further use. The brine may be mixed in a separate tank and can be supplied by water pressure or by a jet or aspirator action into the softening tank. Alternatively, dry salt may be added directly to the water softening tank in some of the systems now used.

The intervals between regeneration of the zeolite depend upon the volume of zeolite and the volume of water passing through and being softened by the zeolite. In many installations, the zeolite must be regenerated every week or oftener and, for that reason, many people prefer not to install water softeners because of the work resulting therefrom.

It has been proposed heretofore to provide means for automatically controlling the regenerating cycle by means of an electrical control system. In such systems a time clock is used to actuate control switches or cams which operate valves to cause washing of the zeolite material, the introduction of salt or brine into the softening tank, the rinsing of the regenerated zeolite material and return of the system to service. However, with these prior systems, it is usually necessary to prepare the brine immediately prior to regenerating the system, so that despite the automatic control of the regeneration cycle, considerable manual effort is nevertheless required at frequent intervals to keep the system in proper operating condition.

The present invention constitutes an improvement over the prior automatic or semiautomatic systems in that it includes a tank in which brine is stored which may be located at a point remote from the water softening tank and which is of such capacity that it need be charged or reloaded only at very infrequent intervals, perhaps, as infrequently as once every three or four months in ordinary usage. The charging of the tank may, if desired, be accomplished by a service agency so that the home owner need not be concerned at all with the preparation of the brine and maintenance of an adequate supply of brine in the brine storage tank.

The new water softening system also includes an automatic control system whereby regeneration of the zeolite may be accomplished at any desired time interval depending upon the volume of water used and the wishes of the householder. Thus, if desired, the timing mechanism may be set to regenerate the zeolite every night when water is not being used or at more frequent or at more widely spaced times, as may be required. All of this may be accomplished by means of a suitable electric time clock which controls a valve unit for regulating the regeneration cycle.

For a better understanding of the present invention reference may be had to the accompanying drawings in which:

Fig. 4 is a view in cross section taken through the control valve for the water softener showing the valves in position for supplying softened water to service;

Fig. 6 is a view in cross section through the control valve unit showing the valves in the position for rinsing brine from the zeolite;

Fig. 7 is an end view of the control unit for the valve shown partly broken away and in section;

Fig. 8 is a view in elevation of the brine tank shown partly broken away to disclose internal details thereof;

Fig. 9 is a view in section through the top cover or end closure of the zeolite tank; and Fig. 10 is a schematic wiring diagram of the electric circuit for controlling the operation of the valves by means of a timing clock.

Figure 1:
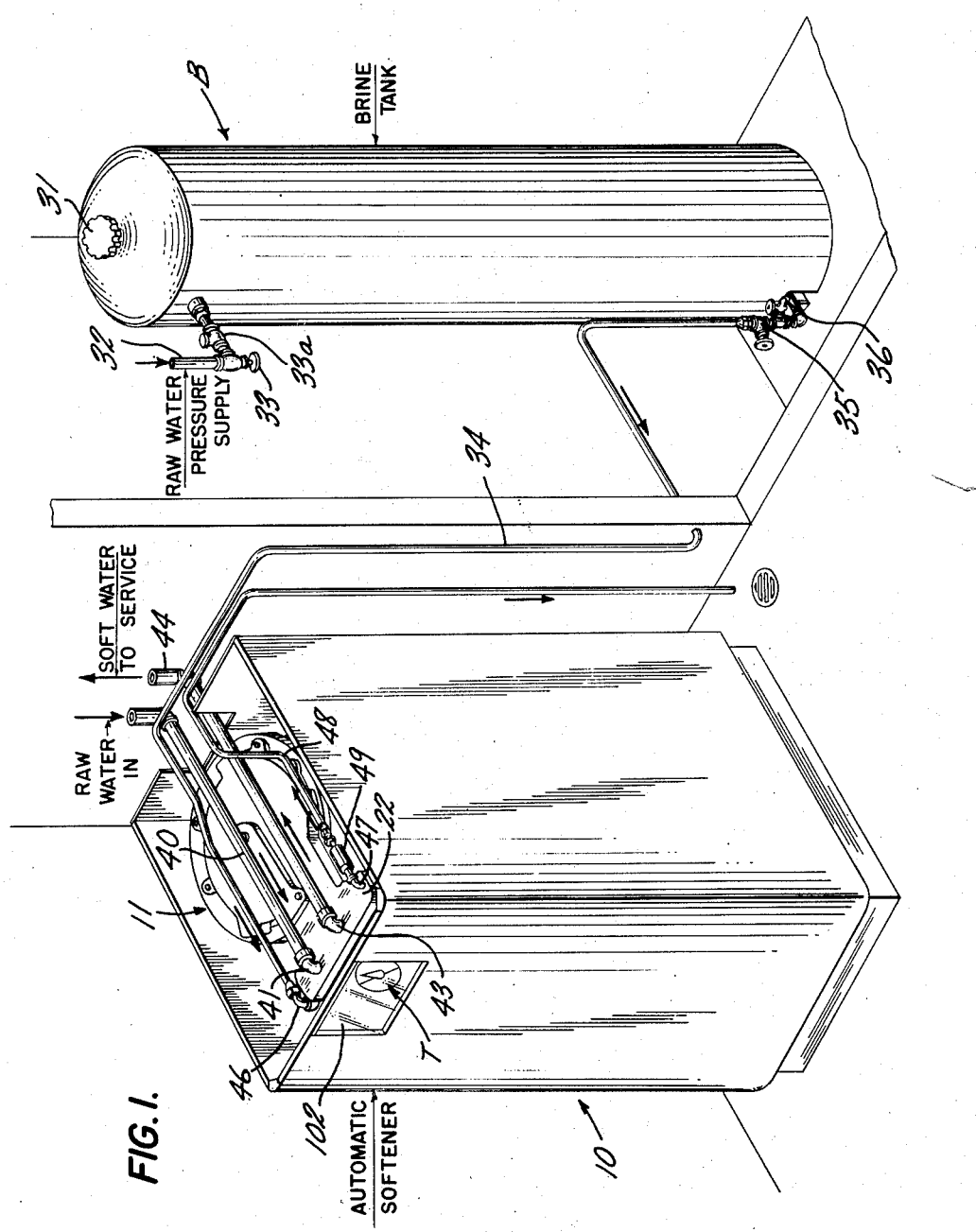
Fig. 1 is a perspective view of a typical household water softening installation embodying the present invention with the cabinet in which the water softener is housed shown with its top removed.

Water softeners of the type embodying the present invention are preferably constructed and designed to enable the softening unit to be installed in a kitchen, utility room or the like so that it matches its surroundings and blends inconspicuously with the other cabinets and units found in such kitchens and utility rooms. To that end, the softener may include a cabinet 10 which may be formed of sheet steel suitably enameled or provided with porcelain coating or the like to resemble a floor cabinet, washing machine, dish washer or the like. The sheet metal cabinet 10 is provided with a top cover, not shown, which may have a linoleum, plastic or similar surface thereon to serve as a table or work area. Within the cabinet 10 is mounted a cylindrical tank 11 formed of galvanized iron, steel, bronze, copper or the like which is adapted to receive a bed 12 of an ion exchange material such as zeolite. The size of the tank 11 may be varied, as required, but preferably it is considerably smaller than the tanks commonly used in household water softeners. For example, it may have a one or two cubic foot bed of zeolite in it. The bottom end of the tank 11 is closed and it has at its upper end a radial flange 13 to which is bolted a cover 14 by means of which connections are made to the interior of the tank for circulation of water and brine therethrough as will be described hereinafter.

Figure 3:
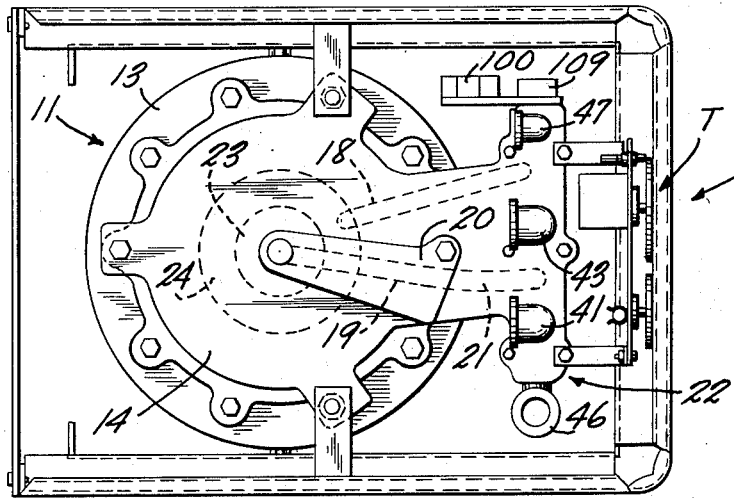
Fig. 3 is a plan view of the water softening tank with the top and cover thereof removed.
Figure 2:
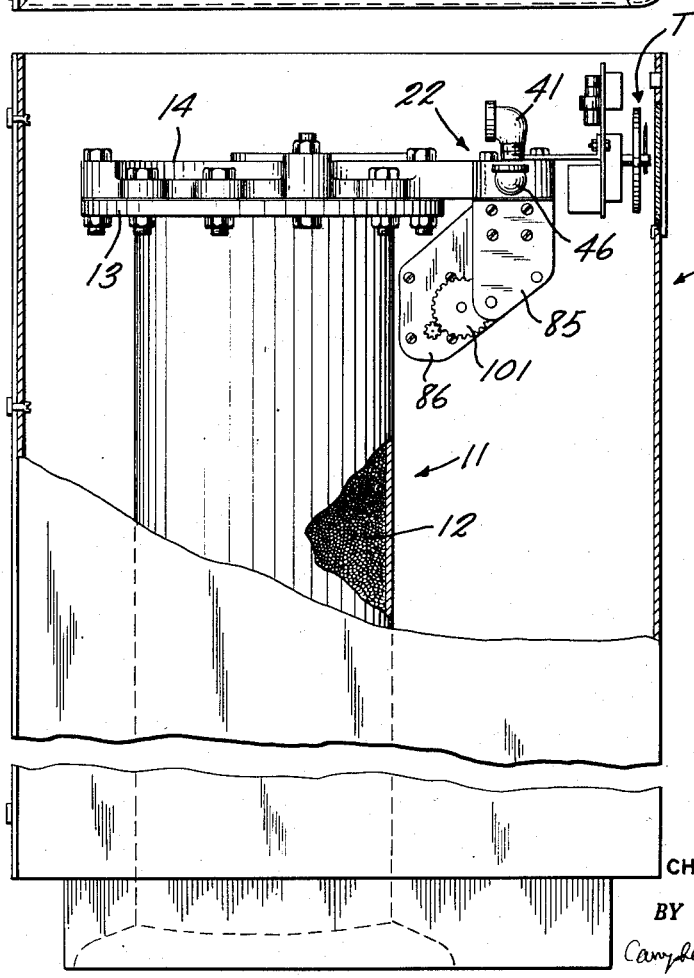
Fig. 2 is a view in side elevation of the water softener with the cabinet broken away and the top removed to disclose details of the softening tank.
Figure 5:
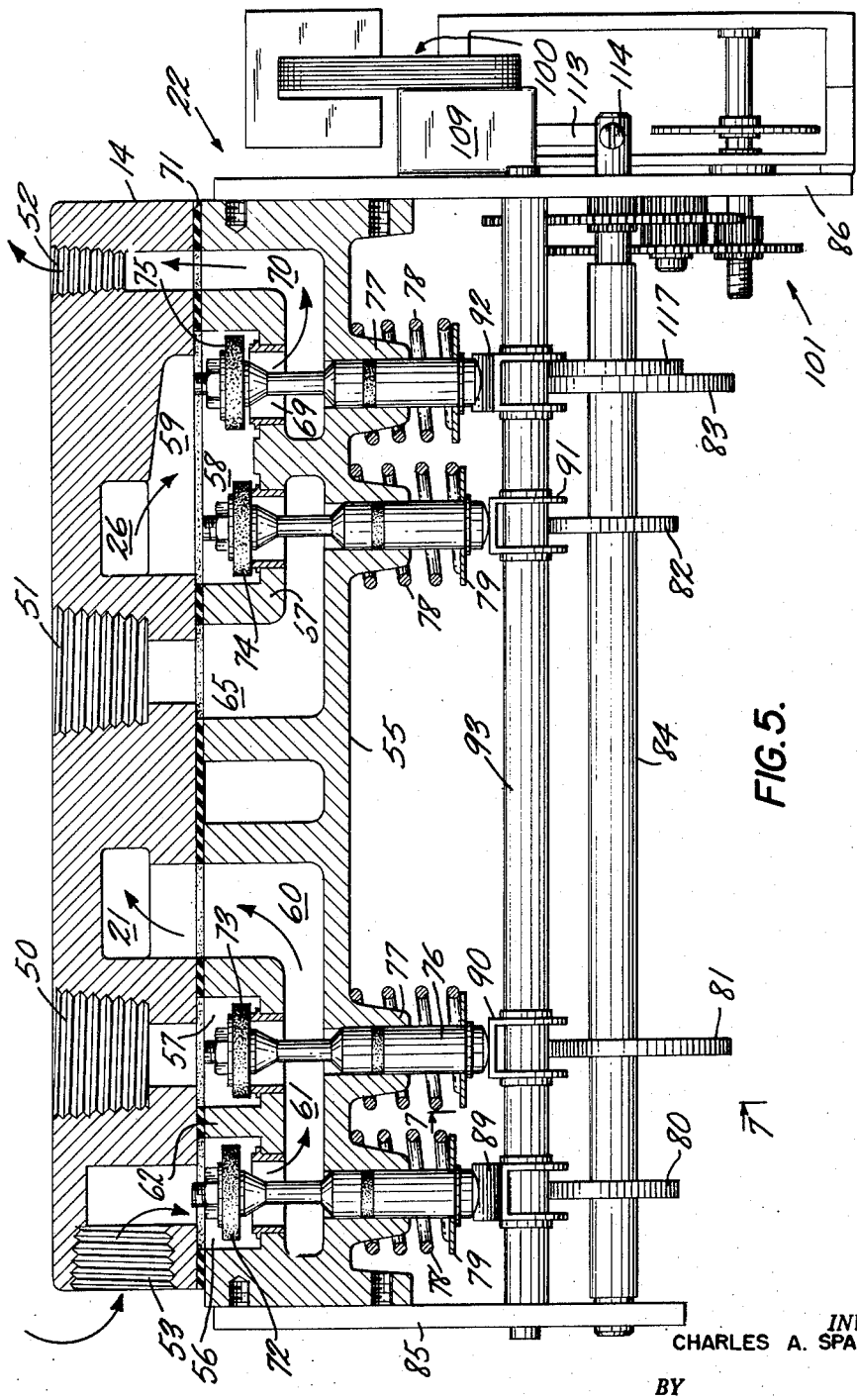
Fig. 5 is a view in cross section through the valve illustrating the valve elements in the position for introducing brine into the zeolite.

Referring to Fig. 9, it will be seen that the cover 14 is provided with a centrally threaded bore 15 to receive a pipe 16 having a strainer 17 at its lower end. The pipe 16 and strainer 17 are used to supply raw water, brine and rinse water to the bottom of the tank for flow upward through the zeolite bed 12 to the outlet passage 18 in the cover. As shown in Figs. 3 and 9, the cover also has a radially extending passage 19 within a raised portion 20 thereof which communicates with the bore 15 and a passage 21 in the top of a valve unit 22 which is carried by the cover plate as best shown in Figs. 2 and 3. The cover 14 also has annular grooves 23 and 24 therein separated by supporting lugs or ribs 25 which communicate with the passage 18 which also extends to and communicates with a passage 26 in the valve unit 22, as shown in Figs. 4, 5 and 6. In order to keep the zeolite bed from being discharged through the passage 18 and to serve as a filter, a screen 27 is arranged inside the cover 14 in a position overlying the grooves 23 and 24. The screen 27 is held in position by means of a ring 28 and screws 29 engaging in a hub 30 in the cover 14.

Referring to Fig. 1, the softening unit thus far described is used in conjunction with a brine tank B which may be of any suitable type and capacity. The tank B may be of several hundred gallons capacity, if desired, and can be mounted or located outside the house, either underground or above ground. The tank is provided with a removable cap 31 by means of which salt can be introduced into the tank. The tank B is supplied with water by means of a raw water line 32 having a suitable manually operated control valve 33 therein. The line 32 may also have a check valve 33a in it to prevent back flow of brine. Brine is delivered from the tank B to the water softening unit by means of a conduit 34 connected to the bottom of tank B and having a manually operated valve 35 and a drain spigot 36 therein. Thus, the brine tank B may be located at a point removed from the water softener and only the two relatively small lines 32 and 34 need be run from the house to the tank in order to supply brine to the water softener.

As shown in Figs. 1 and 3, the raw water from the outside water supply may be supplied to the water softener by means of the conduit 40 which is connected to a coupling 41 in the valve unit 22. The softened water from the softening unit flows from the valve unit 22 through a coupling 43 to the soft water service pipe 44. The brine supply pipe 34 is connected by means of the coupling 46 to the valve unit 22. The fourth coupling 47, shown in Fig. 3, is connected by means of a pipe 48 and a check valve 49 to a drain in any suitable way.

Referring now to Fig. 4, the coupling 41 is connected to the port 50 of the valve unit 22 while the outlet coupling 43, the drain coupling 47 and the brine coupling 46 are respectively connected to the outlet port 51, the drain port 52 and the brine inlet port 53 in the top of the valve unit. As best seen in Figs. 2 and 3, the portion of the valve unit 22 having the ports 50, 51, 52 and 53 therein may be integral with the cover 14 and is provided with suitable transverse passages and ports, as described above. The valve unit includes a lower casing portion 55 provided with valve seats, passages and carrying the control valves as described hereinafter. As shown in Fig. 4, the lower casing portion has pairs of top bores 56 and 57 at its left-hand end communicating respectively with and being in alignment with the ports 53 and 50 of the top section of the unit. The right-hand end of the lower unit has a chamber 58 which underlies a chamber 59 in the upper section of the valve unit which communicates with the passage 26 and the passage 18 in the cover of the zeolite tank.

The lower unit 55 also includes a passage 60 having a lateral extension 61 underlying the bores 56 and 57 and separated therefrom by means of a web or partition 62 in which the valve seats 63 and 64 are mounted. The passage 60 communicates with the passage 21 in the cover of the tank.

The lower section 55 also has a passage 65 therein in alignment with the outlet port 51 and having a lateral extension 66 underlying a partition 67 between the chamber 58 and the passage 66 in which a valve seat 68 is mounted. In a similar manner, a valve seat 69 is mounted in a partition between a passage 70 and the chamber 58.

The two sections of the valve casing are assembled with a suitable gasket 71 interposed between them to prevent leakage between them and to segregate the passages in the manner described above.

Cooperating with the valve seats 63, 64, 68 and 69 are suitable poppet valves 72, 73, 74 and 75 which may have generally disk-like rubber or plastic heads to engage the upper edges of the valve seats. Each of the valves 72 to 75, all of which are similar, has a valve stem 76 which is fitted in leaktight relation in a boss 77 extending downwardly from the bottom of the unit 55. The valves are normally urged against their respective seats as, for example, by means of a coil spring 78 bearing against the inside of the casing section 55 and a spring retainer 79 near the lower end of each valve stem.

Each of the valves 72, 73, 74 and 75 is lifted from its seat by means of a separate cam 80, 81, 82 and 83, respectively, mounted on a cam shaft 84 which is rotatably mounted in the depending side plates 85 and 86 secured to opposite ends of the valve unit 22. The cams do not engage the valve stem directly but, as shown in Fig. 7, engage rollers 87, 88, etc., on the ends of rocker arms 89, 90, 91 and 92, which are pivotally supported on a shaft 93 also extending between and supported by the side plates 85 and 86 in parallel relation to the cam shaft 84. As shown in Fig. 7, the valve stems engage about the midpoint of the rocker arms so that they are lifted as the high points or lobes of the cams pass beneath them.

The cam shaft 84 is driven by means of an electric motor 100 which is shown schematically and is mounted on the side plate 86. The motor 100 drives the cam shaft 84 at greatly reduced speed by means of a reducing gear train 101 interposed between the motor and the cam shaft 84.

The motor is controlled by means of a suitable time clock or electric timer T shown as mounted behind a glass panel 102 in the front of the cabinet 10. The time clock can be of the synchronous motor type and may be provided with a drum or disk commutator for opening and closing a circuit through the motor 100. Through the use of such a timing clock, it is possible to take the water softener out of service, introduce brine into it, allow the brine to stand in the tank until the zeolite bed is regenerated and then direct rinse water through the zeolite bed to remove the remaining salt therefrom. All of this can be accomplished with timing mechanisms of known type and through suitable operation of the motor 100.

It will be understood that the timing clock is adjustable to cause the cycle to be repeated at selected daily intervals or longer, as may required.

Regeneration of the system is accomplished in the following manner. When the timer T reaches the time for regeneration of the water softener, a circuit is closed, as shown in Fig. 10, through the switches 105 and 106 between the terminal $A^1$ of the power source and one side of the gear motor 100. The opposite terminal of the motor 100 is connected by means of a conductor 107 to the other terminal $A^2$ of the power source so that when the switches 105, 106 are closed the motor 100 is set into operation. The motor 100 can also be started manually by means of an independent switch 108. When the motor 100 starts, it closes a switch 109 causing the motor to operate until a regeneration cycle is completed as follows:

Fig. 4 illustrates the elements of the valve unit in the positions assumed when the water softener is in service. As shown, the valves 73 and 74 are open while the valves 72 and 75 are closed (in engagement with their respective valve seats). With the valve elements in the position indicated, the connection between the brine tank B and the passage 21 to the bottom of the tank 12 is shut off. Likewise, the drain port 52 is cut off from the passages 18, 26. However, raw water can flow through the pipe 40, the inlet port 50, through the open valve seat 64, through the passages 60, 21, 19, the pipe 16 and the strainer 17, into the bottom of the tank 11 and up through the zeolite bed therein. The softened water leaving the zeolite bed enters the annular chambers 23 and 24 through the screen 27, flows out of the passage 18, the passage 26, and the chambers 58, 59, through the uncovered valve seat 68 and the passages 65, 66, the outlet 51 and the coupling 43 and pipe 44 to service. This condition continues until the timer T energizes the motor 100 to run through the regenerating cycle.

When the cam shaft 84 has rotated to the position shown in Fig. 5, the valve 72 is lifted and the valve is open as is the valve 75. The valves 73 and 74 are closed. Thus, the raw water supply port 50 and the service port 51 are disconnected from the tank 11 by the valves 73 and 74. Brine is now supplied by water pressure in the line 32 from the brine tank through the conduit 34, coupling 46, brine inlet port 53, through the open valve 72, passages 61, 60, 21, 19, the pipe 16 and the strainer 17 into the bottom of the tank 11 for flow upwardly through the zeolite bed therein. The water displaced by the brine flows out of the passages 18, 26 through the chambers 58, 59 through the open valve seat 69, passage 70, drain port 52 and drain line 48 to discharge.

The cam shaft 84 rotates slowly through the "brine" position for a sufficient period of time to fill the tank with brine, then moves into a position in which all of the valves 72, 73, 74 and 75 are closed. The cams permit valves to remain closed for a period of time sufficient to assure regeneration of the zeolite bed. The cam shaft 84 continues its slow rotation bringing the cams into the position indicated in Fig. 6 in which the inlet valve 73 and the discharge valve 75 are open and the brine supply valve 72 and the service line valve 74 are closed. In this position, raw water enters the inlet port 50, flows past the open valve 73 into the passages 21, 19, the pipe 16 and the strainer 17 to displace the excess brine from the zeolite bed and discharge it through the passage 18, the passage 26, chambers 58 and 59, past the open valve 75 through the passage 70 and the waste port 52 through the drain line 48 to waste. The valves remain in these positions for a sufficient period of time to assure a thorough rinsing of the salt from the zeolite bed. The cam shaft 84 continues to rotate and restores the system to the condition shown in Fig. 4, in which raw water flows through the zeolite bed, is softened thereby and is discharged to service. At this time, the motor 100 opens the switch 109 and the motor stops. The switch 109 is a microswitch having a switch arm 113 which is actuated by an adjustable screw 114 on the cam shaft 84. Rotation of the shaft 84 allows the switch 109 to close as the shaft rotates away from its "service" position and opens the switch 109 as the cam shaft 84 returns to "service" position. The switch 109 acts as a holding switch and allows the switches 105, 106 and 108 to open after the motor 100 is started.

The system described above is susceptible to many refinements in addition to those referred to above. For example, as shown in Fig. 8, the brine tank B may be provided with a convex bottom 115 having a filtering member 116 built therein to screen out and prevent sediment from flowing into the zeolite tank. The brine tank may be formed of suitable corrosion resistant material so as to assure longer operating life.

If desired, one or more of the cams for controlling the valves may be adjusted to control the timing cycle. For example, as shown in Fig. 5, the cam 83 may be rotatably mounted on the cam shaft 84 adjacent to a plate 117 which is fixed to the cam shaft. The cam 83 is provided with a series of holes 118 (Fig. 7) to receive a screw 119 which may be passed through any selected hole 118 and screwed into a hole (not shown) in the plate 117. In this way, it is possible to advance or retard the cam 83 with respect to the other cams 80, 81 and 82 of the device.

From the preceding description, it will be apparent that a system has been provided whereby a water softening unit can be regenerated automatically under the control of a timing device and without the attention of the householder to start or terminate the regeneration cycle. The timing mechanism can be arranged to regenerate daily or at longer intervals solely in accordance with the operation of the time clock. The softening tank may be quite small to facilitate its installation and may be used with a brine system which needs replenishment only at most infrequent intervals, that is, monthly, quarterly, or semi-annually, as may be desired, so that a minimum amount of attention is required to maintain the system in proper condition for efficient and uniform softening of the hard water.

In view of the variations and changes that may be made in the system as indicated above, and in its size, proportions and arrangement of elements, the above-described embodiment of the invention should be considered as illustrative and not as limiting the scope of the following claims.

I claim:

1. A water softening system comprising a tank to receive a bed of water-softening agent, said tank having a side wall, a closed end and an open end, a removable end closure for the open end of said tank, said closure having a first passage therein extending outwardly beyond the side wall of said tank, a distributing pipe supported by said closure and communicating with said first passage, said pipe extending lengthwise of said tank and having a discharge near the end of the tank opposite from said closure, a second passage in said closure extending outwardly beyond the side wall of said tank, a valve unit mounted on said closure and having separate chambers therein communicating with said first and second passages, separate ports to receive raw water and brine in said unit, separate ports to discharge softened water and waste water, separate valves interposed between said raw water and brine ports and the chamber communicating with the first passage, separate valves interposed between said soft water and drain ports and the other chamber, and means to actuate said valves selectively to regenerate the water-softening agent by sequentially admitting brine to the tank, rinsing the agent free of brine and discharging the rinse water to drain, and connecting the raw and soft water ports to said tank and disconnecting said brine and drain ports from said tank.

2. A water softening unit comprising a tank to receive a bed of a softening agent, a removable end closure for said tank, said end closure having an inlet passage and a discharge passage therein communicating with the interior of the tank and extending into an extension of the closure outside the tank, a valve casing section secured to said extension and having separate chambers therein communicating with said inlet and discharge passages, raw water, softened water and waste water ports in said extension, a brine inlet port in said extension, valves in said chambers for controlling flow between said brine and raw water ports and said inlet passage and between said discharge passage and said softened water and waste water ports, and means for opening and closing said valves selectively.

3. A water-softening system comprising a tank to receive a bed of water-softening agent, said tank having a side wall and top and bottom end closures, a distributing pipe extending lengthwise of said tank and having an opening therein communicating with said tank remote from said top end closure, means forming a first passage communicating with said distributing pipe, means forming a second passage communicating with said tank in spaced relation to said opening, a valve unit including a manifold having a first chamber therein communicating with said first passage and a second chamber communicating with said second passage, separate ports in said manifold to receive raw water and brine in said unit, separate ports in said manifold to discharge softened water and waste water, a valve casing detachably connected with said manifold and including first and second passageways connecting said brine and raw water ports, respectively, with said first chamber and third and fourth passageways connecting said softened water and waste water ports, respectively, with said second chamber, separate valves movably mounted in said valve casing and interposed in said first and second passageways between said raw water and brine ports and the first chamber, separate valves movably mounted in said valve casing and interposed in said third and fourth passageways between said soft water and drain ports and the second chamber, and means mounted on said valve casing and detachable therewith from said manifold to actuate said valves selectively to regenerate the water-softening agent by sequentially admitting brine to the tank, rinsing the agent free of brine and discharging the rinse water to drain, and connecting the raw and soft water ports to said tank and disconnecting said brine and drain ports from said tank.

4. The water softening system set forth in claim 3 in which said valves are poppet valves and the means to actuate said valves selectively comprises a cam shaft and a timing motor for rotating said cam shaft.

References Cited in the file of this patent

UNITED STATES PATENTS

| | | |
|---|---|---|
| 1,309,611 | Bungay | July 15, 1919 |
| 1,885,454 | Lauterbur et al. | Nov. 1, 1932 |
| 1,990,722 | Bashioum | Feb. 22, 1935 |
| 2,012,194 | Hughes | Aug. 20, 1935 |
| 2,042,178 | Lauterbur et al. | May 26, 1936 |
| 2,052,515 | Pick | Aug. 25, 1936 |
| 2,203,040 | Bassett | June 4, 1940 |
| 2,265,225 | Clark | Dec. 9, 1941 |
| 2,460,011 | Hungerford et al. | Jan. 25, 1949 |
| 2,596,915 | Pick | May 13, 1952 |